June 30, 1936.　　　　L. D. BOYCE　　　　2,045,829
INTERNAL COMBUSTION ENGINE
Filed April 6, 1931　　　3 Sheets-Sheet 1
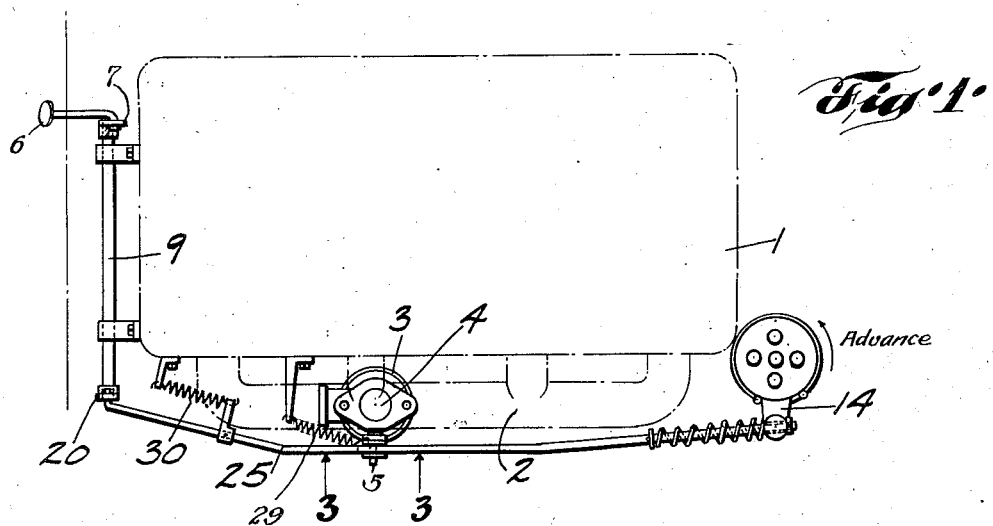
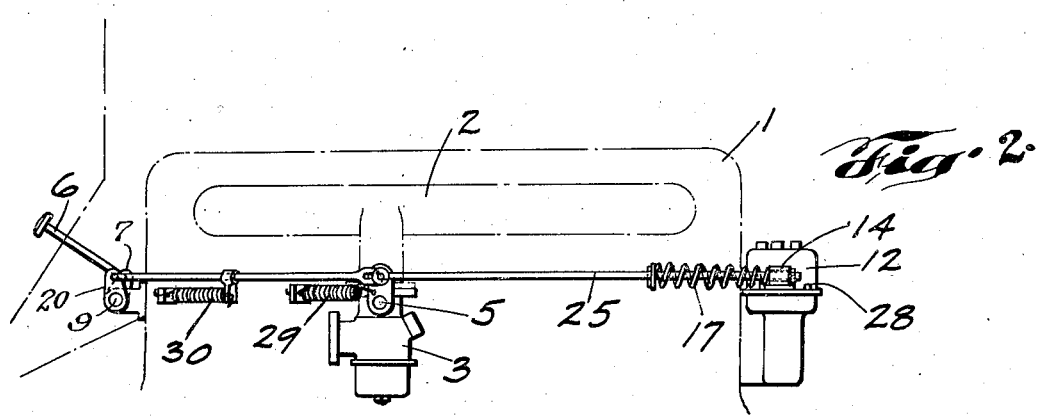
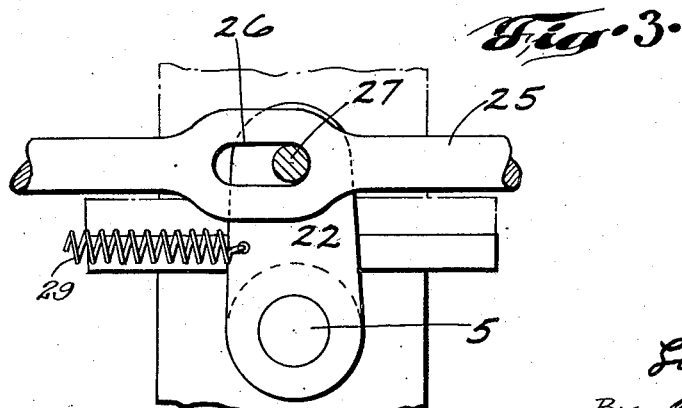

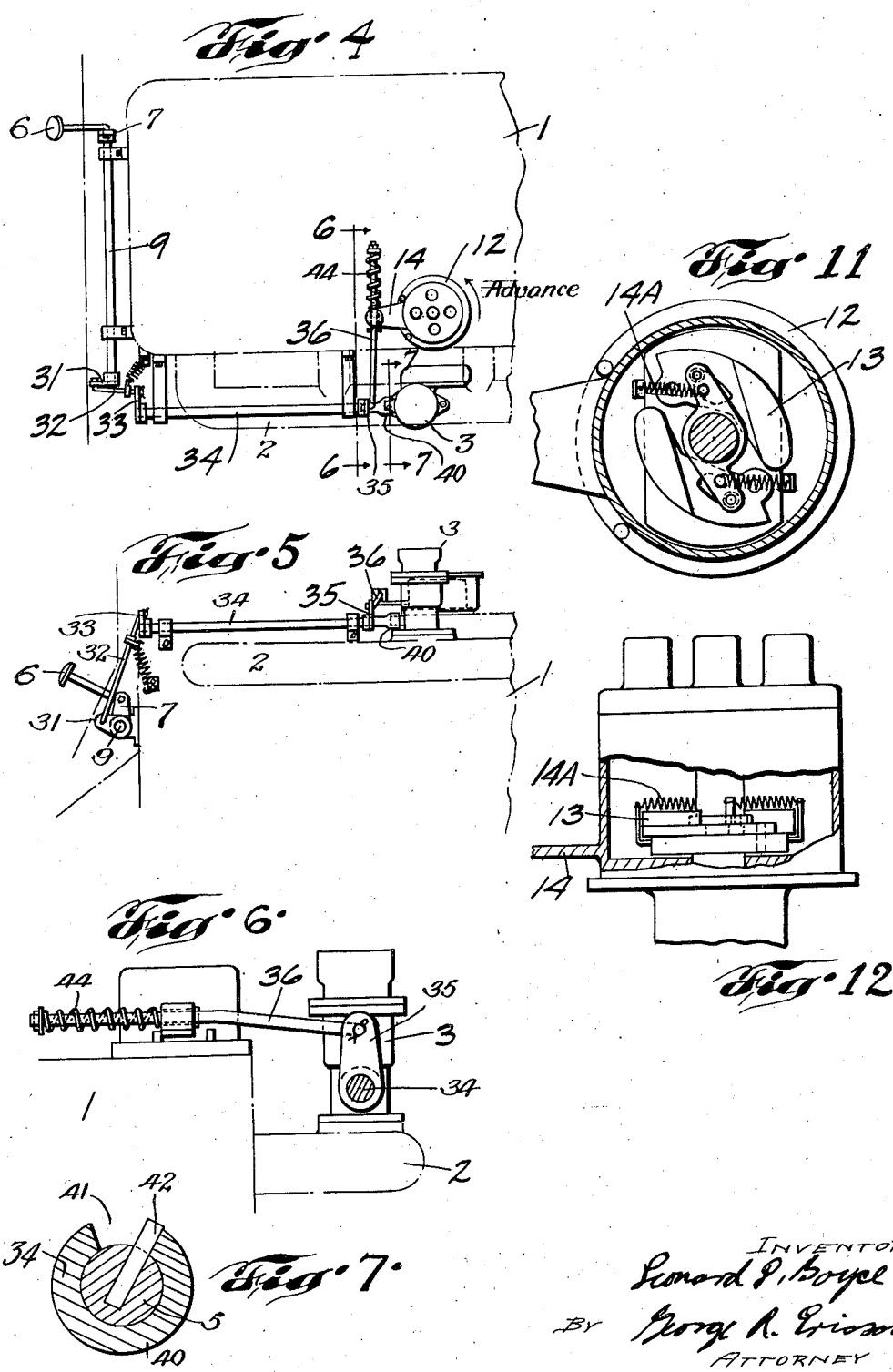

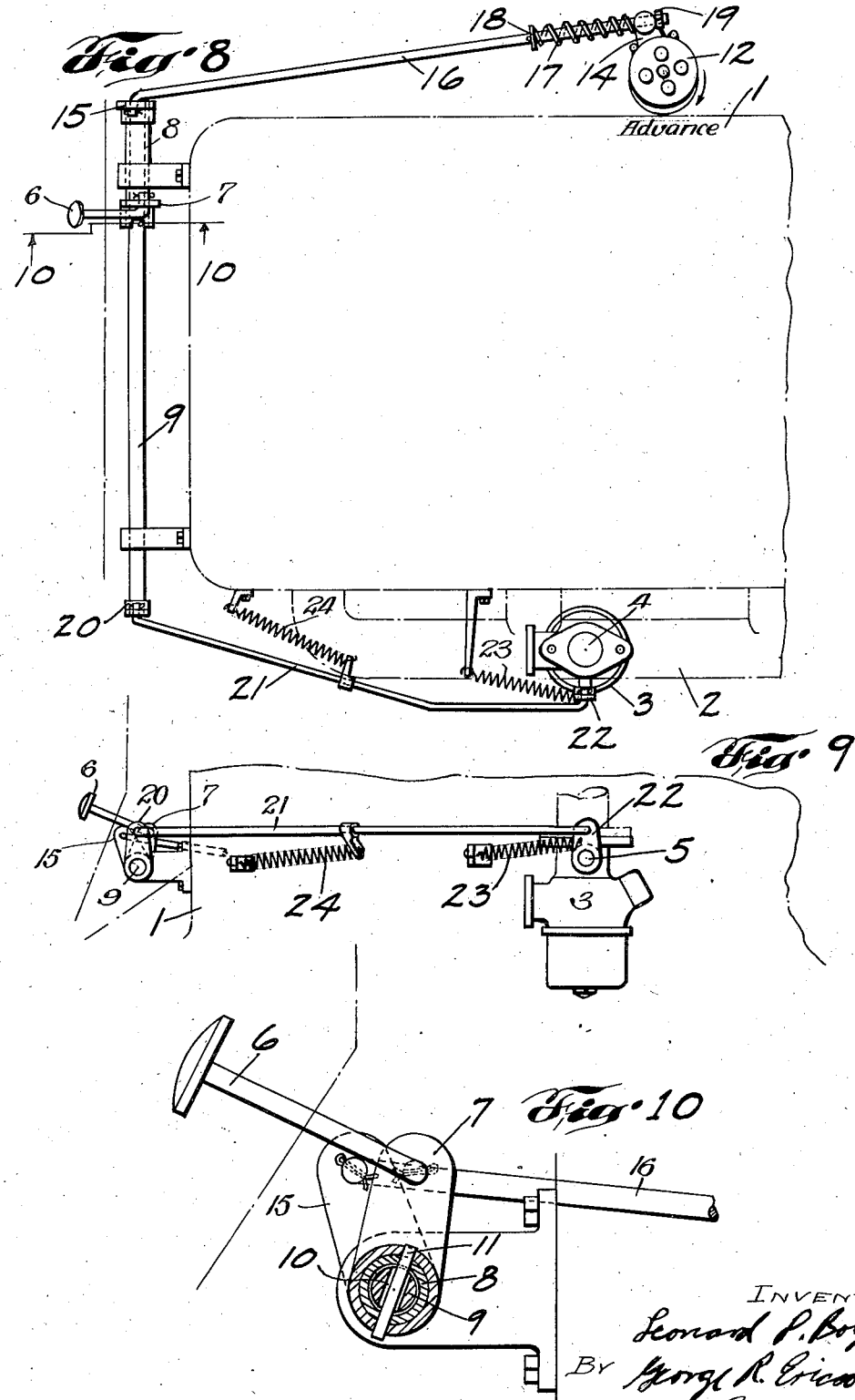

Patented June 30, 1936

2,045,829

UNITED STATES PATENT OFFICE 2,045,829

INTERNAL COMBUSTION ENGINE

Leonard D. Boyce, Maplewood, Mo.

Application April 6, 1931, Serial No. 527,934

9 Claims. (Cl. 123—98)

This invention relates to internal combustion engines and particularly to controlling devices for the spark timing of such engines. It is desirable to control the spark in engines of this type in such a manner that the spark will occur at a later point in the cycle when the throttle is in closed position, and it is also desirable to advance the spark just prior to the opening of the throttle and to keep it advanced during operation of the engine with the throttle open or partly open. I also provide a secondary control for the spark so that the spark is advanced or retarded in accordance with the speed of the engine as well as in accordance with the position of the throttle. The full advance movement of the spark, insofar as it is under the control of the operator, should take place prior to any opening movement of the throttle or at least during the earlier stages of such opening movement, but the secondary control is automatic and provides a further advance of the spark as the speed of the engine increases.

It is the object of this invention to provide a generally new and improved device of the above described character.

Figure 1 is a plan view of an internal combustion engine constructed according to one form of my invention.

Figure 2 is a side elevation of the device shown in Figure 1.

Figure 3 is a detail view showing the connection of the throttle operating rod and throttle shaft.

Figure 4 is a plan view showing a second embodiment of my invention.

Figure 5 is a side elevation of the parts shown in Figure 4.

Figure 6 is an end view of certain of the parts shown in Figure 4.

Figure 7 is a sectional detail view taken along line 7—7 of Figure 4, looking in the direction of the arrows.

Figure 8 is a plan view of a third embodiment of my invention.

Figure 9 is a side elevation of certain of the parts shown in Figure 8.

Figure 10 is a sectional detail view taken along line 10—10 of Figure 8.

Figure 11 is a sectional plan view showing a conventional distributor with automatic spark advance.

Figure 12 is a side elevation of the parts shown in Figure 11 with certain of the parts broken away for better illustration of others.

The reference numeral 1 indicates the cylinder block of an internal combustion engine having the usual intake manifold 2 to which is connected a carburetor 3. The carburetor is provided with the usual throttle valve 4 mounted on a shaft 5 for controlling the admission of fuel mixture to the engine.

The throttle is operated by any conventional foot operated means or its manual equivalent throttle operating means, and in this instance I have shown a foot pedal 6 mounted on a crank 7 which is carried by a rock shaft 9.

The engine is provided with the usual ignition arrangement including spark plugs, a source of high tension current, and the distributor 12. It will be understood that the distributor is geared to the engine in the usual manner so as to form the distributor and ignition timer as an integral unit, and that it is provided with pivoted weights 13 held by springs 14A (Figure 11) which weights are thrown out by centrifugal force for the purpose of advancing the spark during high speed operation and retarding it during low speed operation. This construction is quite conventional and will be fully understood by those skilled in the art. It is undesirable to permit the full automatic operation of the spark control, and in my construction I arrange the automatic advancing device in the distributor in such a manner that the spark can only be partly advanced by the weights 13 when the throttle is in closed position.

The mechanism for accomplishing this comprises a crank arm 14 mounted on the side of the distributor in such a manner that the distributor cap may be rotated in a clockwise or anti-clockwise direction. With reference to Figures 1 and 2, rotation of the distributor cap in a clockwise direction retards the spark and rotation in an anti-clockwise direction advances it. The same is true with reference to the devices shown in Figure 4, but the opposite is true with the device shown in Figure 8.

With reference to the device shown in Figure 1, the rock shaft 9 carries a crank arm 20 which is connected to the operating rod 25. This rod is slotted at 26, as shown in Figure 3, and the crank arm 22 of the throttle shaft is provided with a pin 27 loosely fitted into slot 26. The rod 25 extends beyond the carburetor and is connected to the distributor arm 14 in such a manner that the distributor arm normally tends to move with the rod 25, but when the distributor arm has reached the limit of its movement, as determined by the stop 28, the shaft 25 may continue to move by compressing the spring 17. A suitable spring 29 normally holds the throttle valve in closed position, and a second spring 30 normally holds the rod 25 toward the left, as indicated in Figures 1, 2, and 3, thereby retarding the spark.

With reference to the device shown in Figure 4, the rock shaft 9 carries a crank arm 31 connected by means of a link 32 to a second crank arm 33 which operates the rock shaft 34 which is connected to the throttle shaft of the carburetor. As shown in Figures 5 and 7 the rock shaft 34 is enlarged at the right end to form a sleeve 40 which is mounted on the throttle shaft 5. The sleeve 40 is provided with an elongated slot 41 permitting lost motion between same and the said throttle shaft 5. A key 42 is provided in the said shaft 5 operating in the slot 41. A crank arm 35 is connected to a shaft 36 which extends through the distributor arm 14 being provided with a spring 44 in the manner previously described.

With reference to Figure 8, the crank arm 7 is pivotally mounted on a sleeve 8 which is, in turn, carried by the rock shaft 9. The shaft 9 is provided with an elongated slot 10 permitting lost motion between the movements of the sleeve 8 and the shaft, but the sleeve 8 is firmly keyed to the operating arm 7 by means of a key 11. The sleeve 8 carries a crank arm 15 to which is connected the operating rod 16. The other end of this operating rod passes through the end of the distributor crank arm 14 and is slidable in one direction in the end of the said arm 14 by compressing the spring 17. It will be understood that suitable stops 18 and 19 are provided for the purpose of limiting the movement of the rod 16 with respect to the crank arm 14. The rock shaft 9 also carries a crank arm 20 to which is connected a rod 21 which has its other end pivotally connected to the crank arm 22 on the throttle shaft 5 of the carburetor. Suitable springs 23 and 24 hold the throttle rod 21 in normally closed position.

The operation of the device is as follows:

With reference to the device shown in Figures 1 to 3, the spring 30 normally holds the throttle valve 4 in closed position and also holds the arm 14 of the distributor in its left hand limiting position (Figure 1), thereby retarding the spark. During the starting of the engine the foot pedal 6 is depressed rotating the rock shaft 9, and moving the rod 25 to the right in the device shown in the Figure 1 and Figure 2 upon which the spark is fully retarded insofar as it is controlled by the automatic mechanism contained in the distributor head but fully advanced in so far as it is controlled by the rod 25 and spring 17 and the throttle is partially closed. After the engine is started and when the operator desires to increase its speed, he steps on the pedal 6, moving the rod 25 to the right as shown in Figures 1 to 3. This takes up the lost motion in the slot 26, but at the same time pushes the arm 14 up against the stop 28, thereby advancing the spark to its full extent. This, in itself, will slightly increase the speed of the engine, and a further movement of the rod 25 will cause the throttle crank arm 22 to be operated in a clockwise direction, thereby opening the throttle valve 4. This further movement of rod 25 in a direction to open the throttle valve can not result in the further advance of the spark, but simply in compression of the spring 17.

With reference to the parts shown in Figures 4 to 12, the operation is mechanically the equivalent of the operation of the device shown in Figures 1 to 3.

With reference to the device shown in Figures 4, 5 and 6, depression of the foot pedal 6 rotates the rock shaft 9, actuating the crank arm 31, link 32, crank arm 33, rock shaft 34, crank arm 35, shaft 36 and thence the distributor arm 14, advancing the spark. Further movement of the foot pedal 6 will further rotate the rock shaft 34, and open the throttle valve 4, the lost motion provided by the slot 41 having been taken up. This further movement of the shaft 36 is allowed by the spring 44 while the arm 14 is stationary.

With reference to the device shown in Figures 8, 9 and 10, depression of the foot pedal 6 rotates the sleeve 8 actuating the crank arm 15, operating rod 16 and hence distributor arm 14 advancing the spark. Further movement of the foot pedal 6 causes further movement of the sleeve 8 and the operating rod 16, but the distributor arm 14 having reached the limit of its motion the spring 18 takes up the remaining motion, the lost motion of the slot 10 having been taken up by the initial movement of the foot pedal 6. This latter movement causes rotation of the rock shaft 9 and crank arm 20, which in turn moves the rod 21, crank arm 22 and hence opens the throttle valve 4.

The invention is not limited in details to the various forms shown, but may be modified as will occur to those skilled in the art and the exclusive use of all such modifications as come within the scope of the appended claims is contemplated.

I claim:

1. In an internal combustion engine, means for supplying fuel mixture thereto, a throttle, means supplying a spark for igniting said fuel mixture, an operating arm connected to said spark supplying means for varying the point in the cycle of operation at which the spark occurs, said operating arm being connected to said throttle means for controlling the same, said connections being constructed and arranged to insure that the spark is always fully advanced except when said throttle is fully closed.

2. In an internal combustion engine having a carburetor and a spark distributor, a throttle for controlling said carburetor, an arm for controlling said distributor to advance or retard the spark, spring means for simultaneously holding the throttle in closed position and holding the distributor in retarded position, means comprising a spring for advancing said distributor prior to the opening of said throttle and simultaneously compressing said last named spring, and means for closing said throttle prior to the retarding of said distributor.

3. In an internal combustion engine, a carburetor having a throttle valve, a timer for supplying a spark to the engine at each cycle of operation, a manual control member connected to said throttle, and a connection between said member and said timer, said connection including a spring and being constructed and arranged to operate said timer in such a manner as to cause the advancing of said spark previous to the throttle opening movement.

4. In an internal combustion engine, a carburetor having a throttle valve, a timer for supplying a spark to the engine at each cycle of operation, said timer having a rotatable arm for advancing or retarding said spark, said carburetor having a throttle shaft, and a single operating means connected to said throttle shaft by means of a lost motion connection and to said distributor arm by means of a spring, said connection being so constructed and arranged as to cause a substantial completion of the movement of said timer arm before the opening movement of the throttle is started.

5. In an internal combustion engine, means for supplying fuel mixture, a throttle for controlling said fuel supply means, means for supplying a spark for igniting said fuel mixture, and an operating arm connected to said spark supplying means for varying the point in the cycle of operation at which the spark occurs, said operating arm being connected to the throttle by means comprising a rod and spring in such a manner as to cause the spark to be fully advanced prior to the initiation of the throttle opening movement and held in fully advanced position during the remainder of the throttle opening movement.

6. In an internal combustion engine, a carburetor having a throttle valve, an iginition timer having an operating arm, and manually operated means operatively connected to said ignition timer arm, said manually operated means having a lost motion operating connection with said throttle valve, said manually operated means being constructed and arranged to impart a substantial movement to said ignition timer arm prior to the initiation of the opening movement of said throttle by said manually operated means.

7. In an internal combustion engine, fuel mixture supply means including a throttle, an ignition device, a control element for varying the timing of said device, an operating member, and connections between said operating member, said control element, and said throttle, said connections being constructed and arranged to cause substantial movement of said control element prior to initial movement of said throttle when said operating member is moved.

8. In an internal combustion engine, a carburetor, a throttle for said carburetor, a spring for normally holding said throttle in closed position, an ignition timer for supplying a spark for igniting the fuel mixture supplied by said carburetor, said timer having a manually adjustable arm for varying the timing of said spark spark, a spring for normally holding said arm in position to retard said spark, an operating member, and connections between said operating member, said ignition timer, and said throttle, said connections being constructed and arranged to advance said spark without opening said throttle when said operating member is moved.

9. In combination with an internal combustion engine, a carburetor including a throttle, an ignition device having a movable element for varying the ignition timing, means limiting the movement of said element, a manually operable member, and a part connecting said member with said movable element for positively moving said element towards said limiting means, said part having a lost motion connection with said throttle whereby said element may be moved a substantial distance without affecting said throttle, and the connection between said part and said movable element being adapted to yield when said element reaches said limiting means to permit continued movement of said part and said throttle.

LEONARD D. BOYCE.